Oct. 6, 1970  P. T. COTÉ ET AL  3,532,931
PHOTOFLASH ASSEMBLY FOR SEQUENTIALLY FLASHING LAMPS
UTILIZING VOLTAGE AND CURRENT RESPONSIVE DEVICES
Filed Dec. 16, 1968
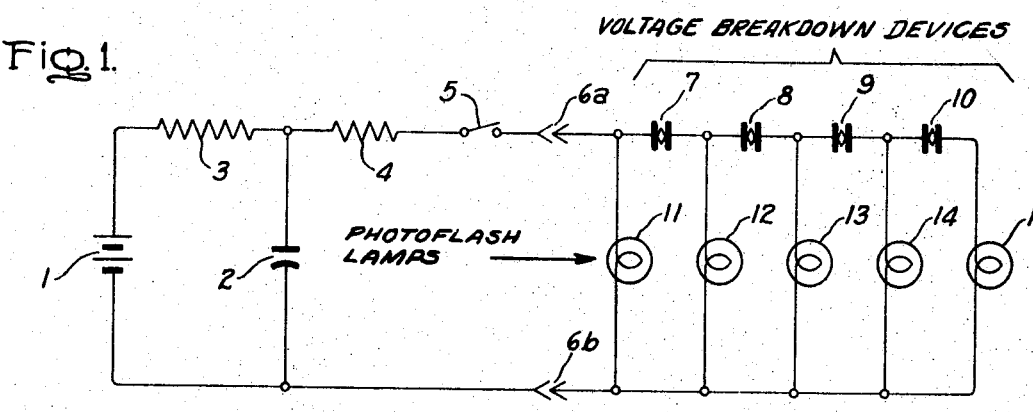
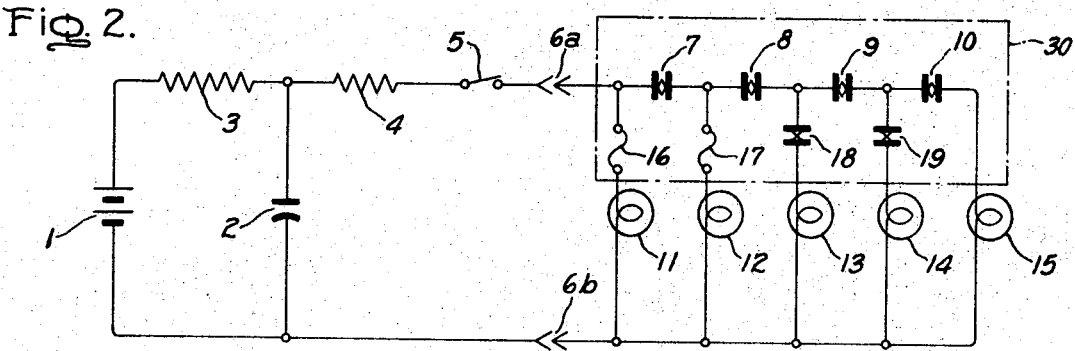
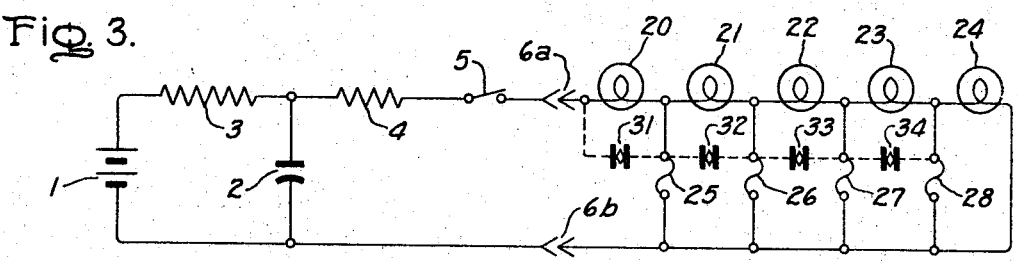
Inventors:
Paul T. Coté
John D. Harnden, Jr.
by Richard H. Burgess
Their Attorney United States Patent Office 3,532,931
Patented Oct. 6, 1970

3,532,931
PHOTOFLASH ASSEMBLY FOR SEQUENTIALLY FLASHING LAMPS UTILIZING VOLTAGE AND CURRENT RESPONSIVE DEVICES
Paul T. Coté, Cleveland Heights, Ohio, and John D. Harnden, Jr., Schenectady, N.Y., assignors to General Electric Company, a corporation of New York
Filed Dec. 16, 1968, Ser. No. 784,094
Int. Cl. H05b 37/00, 41/34
U.S. Cl. 315—240                          28 Claims

ABSTRACT OF THE DISCLOSURE

A multilamp photoflash assembly having a multiplicity of photoflash lamps wherein static voltage-sensitive or current-sensitive devices are used to switch the applied current from one lamp to the next for sequential flashing. Voltage breakdown devices in the series leg between branch circuits of lamps in parallel across the terminals of a capacitor are useful especially with lamps which are reliably nonshorting upon flashing. With lamps which reliably become short-circuited upon flashing, a series connection of lamps with current-sensitive fuse devices in parallel with each other connected from between the lamps to a common connection to the capacitor is useful. When the lamps are not reliably nonshorting upon flashing, current-sensitive fuses or heat- or light-sensitive circuit breakers can be used in series with each lamp in the voltage breakdown device embodiment of the invention to assure that the branch circuit of each lamp becomes an open circuit upon flashing of that lamp.

BACKGROUND OF THE INVENTION

Various means are available for switching a flash-start electrical signal from one lamp to the next in a multilamp photoflash array including electro-mechanical and thermal switching means such as, respectively, ratcheting relays and melting insulators. The thermal switches available generally take the form of devices which must be located adjacent to the lamp and controlled by the heat of flashing.

Static electrical control circuit means, particularly such means as could be produced in the form of an integrated circuit by batch deposition techniques, would be especially desirable for rapid, reliable, low cost switching of multilamp photoflash arrays.

SUMMARY OF THE INVENTION

Thus, it is an object of the present invention to provide a photoflash assembly for reliably, selectively, sequentially flashing separate lamps in a multilamp array wherein the switching from one lamp to the next is performed by a device whose electrical resistance is greatly altered by applied voltage or current. A further object is to provide such an assembly in low cost form, particularly in a form that can be mass-produced by integrated circuit techniques.

Briefly stated, the present invention in certain of its embodiments provides static electrical control circuit means in a photoflash assembly for flashing separate lamps in an array of a multiplicity of photoflash lamps with an electrical signal for initiating a flash of light from at least one of the lamps. The static electrical control circuit means is coupled to and controlled by the electrical signal and also electrically coupled to and electrically controlling the array of photoflash lamps for selectively, sequentially flashing at least one of the photoflash lamps. Furthermore, the static electrical control circuit means comprises at least one two-terminal circuit element whose electrical resistance characteristics are markedly responsive to at least one of applied voltage and current.

One such preferred circuit element comprises a device, such as a voltage breakdown device, which initially has a high resistance to the flow of current and demonstrates a marked drop in resistance upon the application of a voltage or a rate of voltage change above a certain threshold level. Certain commercial forms of such circuit elements are known as voltage breakdown devices and have an irreversible drop in resistance due to dielectric breakdown such as of an anodically oxidized film on a metal conductor substrate such as aluminum with another conductor adhering to the surface of the oxide. In case the photoflash lamps cannot be completely relied upon to become open circuits upon flashing, current-sensitive fusing elements or heat-sensitive or light-sensitive circuit interrupters can be used in series with each lamp to assure that the circuit of the lamp will become an open circuit upon flashing.

An alternate form of the invention uses a current-sensitive fusing element as the primary controlling circuit element. Such fusing elements initially have low resistance to the flow of current and, upon the passage of the electrical current used in flashing one of the lamps, they undergo a marked increase in resistance. Of course, the extent of increase in resistance when using a fusing element or decrease of resistance when using a fusing element or decrease of resistance when using a voltage breakdown device, and the respective high and low resistance values called for herein should be of such magnitude as to control the flow of sufficient current through a photoflash lamp to flash the lamp, or to prevent the flow of such current, as the case may be, so as to be operative with the invention. Two-terminal circuit elements of the invention include voltage breakdown devices and circuit opening devices such as fuses, as contrasted to such circuit elements as silicon or germanium components having three or more terminals being used. A multiplicity of two-terminal devices can be used together and still remain within the scope of the invention.

BRIEF DESCRIPTION OF THE DRAWINGS

FIG. 1 is a schematic circuit diagram showing a battery-capacitor power supply of the type normally used in a camera with suitable resistances and a switch in one leg of the circuit. Readily opened contacts are provided from this power source to an array of photoflash lamps with voltage breakdown devices arranged in a suitable circuit for operation of the invention.

FIG. 2 shows a similar circuit with current-sensitive fusing devices or heat-sensitive or light-sensitive circuit breakdown devices in series with each lamp in accordance with a variation of the invention.

FIG. 3 shows an alternate circuit of the invention similar to FIG. 1 in its power supply, but different in that the lamps are wired in series, and current-sensitive fusing elements are used rather than voltage breakdown devices to control switching from one lamp to the next. Optionally, voltage-sensitive devices can be used in parallel with each lamp.

DESCRIPTION OF THE PREFERRED EMBODIMENTS

The present invention provides a means for instantaneous or very rapid switching from one photoflash lamp to another in a multiple array of photoflash lamps. These means utilize circuit elements which can be mass-produced by integrated circuit techniques and which can be made inexpensive enough so that they can be discarded after the flashing of each multilamp photoflash array without making the cost of the array prohibitive. With lamps which develop open circuits upon flashing, voltage breakdown devices alone can be used as shown in FIG. 1. When the opening of the lamp circuit upon flashing is not certain, fusing elements or heat-sensitive circuit breakers can be used in series in the branch circuits of each lamp as shown in FIG. 2 along with the voltage breakdown devices. If the open-circuiting of the lamp is certain, the fuse would be superfluous but not harmful. When lamps are used which reliably short-circuit upon flashing, current-sensitive fusing elements can be used as shown in FIG. 3 without any voltage breakdown devices. Alternatively, analogous to FIG. 2, circuit elements which short-circuit on flashing of the lamps such as voltage breakdown devices, or heat- or light-sensitive switches can be added to the circuit of FIG. 3, as shown by dotted lines, one in parallel with each lamp except the last. This will assure short-circuiting of the circuit of each lamp.

Wtih presently available relatively inexpensive irreversible voltage breakdown devices and fusing elements, the control circuits of the invention can preferably be made disposable. With reversible voltage breakdown or current turnoff devices, the control circuits of the invention can be made permanent and could be built into a camera or a flashgun, thereby somewhat lowering the cost of the disposable multilamp photoflash array. Certain silicon, germanium, thin film, or amorphous semiconductive devices could be used as reversible circuit elements for the invention.

Turning now to FIG. 1 of the drawings, when switch 5 is open, as it normally is, battery 1 such as a 15-volt battery is continuously charging a capacitive element such as capacitor 2 through resistance 3. Resistance 3 is suitably about 1000 ohms, and capacitor 2 is suitably between 50 and 100 microfarads. When the multiple flash lamp array is plugged into the contacts at 6a and 6b, upon the closing of switch 5, a limited energy electrical signal is drawn from capacitor 2 through resistor 4. With suitable selection of resistances of the first photoflash lamp 11 and resistor 4 such as 0.7 ohm for the photoflash lamp and 0.35 ohm for resistor 4, the voltage is divided with 10 volts being applied across the photoflash lamp and 5 volts being applied across resistor 4. This split in the applied instantaneous voltage is adequate to flash lamp 11, although it is not adequate to cause dielectric breakdown and current passage through voltage breakdown device 7. Suitable $Al-Al_2O_3-Ag$ voltage breakdown devices are available with breakdown voltages of about 10 or 13.5 volts, having a very high resistance greater than 10 megohms below that voltage. The symbol used for the voltage breakdown devices 7, 8, 9 and 10 indicates a very high resistance until the dielectric breakdown strength is reached and current starts to flow. By the time lamp 11 has flashed, opening the circuit, the voltage from capacitor 2 has dropped below the 13.5 volts necessary to cause breakdown in voltage breakdown device 7. Assuming that lamp 11 becomes an open circuit upon flashing, on the next application of an electrical signal from capacitor 2 through switch 5, the full 15 volts will be applied first to voltage breakdown device 7 and will cause dielectric breakdown in it and current flow through it and lamp 12 which then flashes. Likewise, similar action occurs with subsequent pairs of voltage breakdown devices and lamps including lamp 13 and voltage breakdown device 8, lamp 14 and voltage breakdown device 9, and then finally with the last lamp 15 in the series and voltage breakdown device 10.

Each voltage breakdown device and each lamp can have the same characteristics for this system. Thus, it is not necessary to manufacture or discriminate between lamps or devices of different characteristics for different parts of the circuit.

FIG. 2 shows a circuit very similar to that of FIG. 1 except that circuit elements 16, 17, 18 and 19 are included in the branch circuits of each photoflash lamp 11, 12, 13 and 14 to assure that the branch circuit of each lamp will become an open circuit upon the flashing of the lamp in that circuit. Circuit elements 16, 17, 18 and 19 can suitably be current-sensitive fusing elements each of which initially has very low resistance and opens or attains a very high resistance equivalent to an open circuit for purposes of the invention upon the application of the amount of current for the period of time required to at least initiate self-sustaining flashing of the photoflash lamp. Also, many camera switches are closed for 100 to 200 milliseconds. If the lamp does not burn out and present an open circuit in that period of time, a slower current-sensitive fuse would be designed to do so. Alternatively, circuit elements 16, 17, 18 and 19 can suitably be heat-sensitive circuit breakers placed in the circuit adjacent their respective lamps to perform the same function as described above for the current-sensitive fuses.

As a further alternative, circuit elements 16, 17, 18 and 19 can be light-sensitive circuit breakers which open when actuated by the burst of light from flashing of their respective lamps. Either such circuit element could be arranged to see a part of their particular lamps, or light pipe means could conduct such light to the appropriate circuit element. Although circuit elements 16 and 17 are shown as irreversible current- or heat- or light-sensitive elements, reversible circuit elements could be used instead as shown at 18 and 19. Such elements open on the application of sufficient energy, and then can be made to close when desired, such as after the used lamp has been replaced by a fresh lamp.

In FIG. 2, the voltage breakdown devices 7, 8, 9 and 10 are shown located near to circuit elements 16, 17, 18 and 19, with all being enclosed in dot-dashed outline 30. This emphasizes that these circuit members can be formed by integrated circuit techniques on a single substrate. If reversible, reusable members were used, multiple electrical contacts from the camera or the permanent photoflash apparatus would be made to the lamp as at 6b and at the entrance of the circuit from each lamp into dot-dashed box 30.

FIG. 3 utilizes the same signal circuit as FIGS. 1 and 2. The lamps 21, 22, 23 and 24 are lamps which reliably form short circuits upon flashing. As the electrical signal of limited energy from capacitor 2 flows through closed switch 5 to flash the first lamp 20, it then completes the circuit back to the other side of capacitor 2 through fuse 25 which has a much lower resistance than the parallel branch circuit starting with lamp 21 so that the voltage will be divided in such a way that the current through lamp 21 is not sufficient to flash it if that is not desired when lamp 20 is flashing. As is apparent, fuse 25 is designed to burn out and provide an open circuit after the flashing of lamp 20. Alternatively, if current-sensitive solid-state switching devices are used, the circuit is then effectively open. Therefore, on the application of the next electrical signal from capacitor 2, lamp 21 flashes and fuse 26 burns out, thus permitting the sequence to be repeated through the series of photoflash lamps. Of course, a fuse following the last lamp in the series is not necessary.

Voltage breakdown devices 31, 32, 33 and 34 are shown in dotted line circuits in parallel with each lamp 20, 21, 22 and 23 to assure that the lamps will effectively become short-circuited after flashing. Such alternate circuits can be used when the shorting character of the lamps is not certain.

It is obvious that various modifications can be made in these circuits to permit the flashing of more than one lamp at a time if greater illumination is desired on the scene than can be obtained by the use of one lamp alone. This could be done in FIG. 3, for instance, by allowing the user to take out of the circuit one or more of fuses 25, 26, 27 and 28 so that the signal from capacitor 2, assuming the design of the system provides enough energy, goes through more than one lamp before it is diverted back to the other side of capacitor 2 through the first conducting fuse it reaches.

Suitable voltage breakdown devices can be made with anodically oxidized aluminum, aluminum-silicon alloys, titanium, tantalum, zirconium or other suitable metals, with top conductors over the oxide of various metals such as silver or gold preferably deposited by silk-screen printing. Al-Al$_2$O$_3$-Ag voltage breakdown devices are available from Sprague Electric Company and have the component numbers 95D913.5A for the 13.5-volt unit.

Certain varieties of voltage-sensitive switches widely discussed by Energy Conversion Devices, Inc., Troy, Mich., may have suitable characteristics for use in these circuits. See Control Engineering, April 1964, pp. 69–72, "The Threshold Switch—A New Component for A-C Control." The commercially marketed A-C switch is a candidate for use as a reversible reusable member, and is described in the literature as being fabricated from "a mixture of tellurium, arsenic, silicon, germanium and other common materials." Corresponding irreversible devices referred to by that company as memory elements have been described but not commercially made available.

Current fusing devices that can be used with the invention can be formed by silk-screen printing, leaving portions of small cross section to act as the fusing elements. Also, small calibrated fuse wires can be connected across openings in substrate materials for thermal isolation from the substrate and so that, upon melting, the fusing element will positively fall out of the circuit.

Current-sensitive irreversible static switching elements have been sold under the trade name of "Hypersensors" by Qualtronics Corporation, 1100 E. Ash St., Fullerton, Calif. and further described in Design News, June 24, 1964, in an article entitled "Metal Metal-Oxide Device Guards Semi-conductors." The current-sensitive irreversible static switching elements can be used to provide the circuit opening function described in this invention. In addition, they may be used as reversible switching elements provided a deliberate resetting means such as high frequency signal is employed.

Various embodiments of the invention are described above and further embodiments will be apparent to those skilled in the art. As new circuit elements, particularly solid-state electronic devices, become available, their applicability to the present invention will be apparent by analogy to the devices herein described.

What we claim as new and desire to secure by Letters Patent of the United States is:

1. In a photoflash assembly for selectively and sequentially flashing separate lamps in an array of a multiplicity of photoflash lamps with an intermittently produced electrical signal for initiating a flash of light from at least one of the lamps, the improvement comprising static electrical control circuit means coupled to and controlled by said electrical signal and being electrically coupled to and electrically controlling the array of photoflash lamps for selectively flashing at least one of said photoflash lamps by means of said electrical signal upon each occurrence thereof, said static electrical control circuit means comprising at least one two-terminal circuit element whose electrical resistance characteristics are markedly responsive to at least one of applied voltage and current.

2. A photoflash assembly according to claim 1 wherein said static electrical control circuit means comprises a device which initially has a high resistance to the flow of current and, upon the application of a voltage above a certain threshold, demonstrates a marked drop in resistance.

3. A photoflash assembly according to claim 2 wherein said electrical control circuit means also comprises a current-sensitive fusing element.

4. A photoflash assembly according to claim 2 wherein said electrical control circuit means also comprises a heat-sensitive circuit interrupter.

5. A photoflash assembly according to claim 2 wherein said electrical control circuit means also comprises a light-sensitive circuit interrupter.

6. A photoflash assembly according to claim 2 wherein the drop in resistance of said device is irreversible.

7. A photoflash assembly according to claim 6 wherein said static electrical control circuit means comprises a voltage breakdown device which initially has a high resistance and which, upon application of at least a certain voltage, undergoes dielectric breakdown and then has a low resistance, said device comprising an anodically oxidized metal substrate with a conductor adhering to the surface of the oxide.

8. A photoflash assembly according to claim 6 wherein said static electrical control circuit means comprises a voltage breakdown device which initially has a high resistance and which, upon application of at least a certain rate of voltage change, undergoes dielectric breakdown and then has a low resistance, said device comprising an anodically oxidized metal substrate with a conductor adhering to the surface of the oxide.

9. A photoflash assembly according to claim 7 wherein said substrate is aluminum and the oxide is aluminum oxide.

10. A photoflash assembly according to claim 1 wherein said static electrical control circuit means comprises a device which initially has a low resistance to the flow of current and, upon the passage of the electrical current used in flashing one of said lamps, demonstrates a marked increase in resistance.

11. A photoflash assembly according to claim 10 wherein said electrical control circuit means also includes a voltage sensitive element which changes from a high resistance to a low resistance upon flashing of a lamp.

12. A photoflash assembly according to claim 10 wherein the increase in resistance of said device is irreversible and is essentially equivalent to an opening of the circuit.

13. A photoflash assembly according to claim 1 wherein the static electrical control circuit means and the flash lamps along with a reflector member are supported in a discardable housing separate from the camera with which it is to be used, the entire discardable housing, static electrical control circuit means, reflector member and expended flash-bulbs being expendable after all the bulbs have been flashed.

14. A photoflash assembly according to claim 1 wherein said electrical signal is of limited energy.

15. A photoflash assembly according to claim 14 wherein said electrical signal is derived from a capacitive element which is essentially continuously charged by a battery through a resistance.

16. A photoflash assembly according to claim 14 including means by which the first occurrence of said electrical signal is applied directly to a first photoflash lamp to flash said first photoflash lamp, and including a voltage-sensitive switch connected between said first photoflash lamp and a second photoflash lamp whereby upon a second occurrence of said electrical signal said voltage-sensitive switch breaks down and closes thereby permitting said electrical signal to act upon and flash said second photoflash lamp.

17. A photoflash assembly according to claim 2 wherein a multiplicity of photoflash lamps, each in a separate branch circuit, is connected in parallel across the terminals of a chargeable capacitive element with a resistance and a normally open switch in one leg of the circuit between the capacitor and the first lamp, and wherein a normally open voltage breakdown device is placed in one leg of said circuit in series connection between the interconnections of the branch circuits for each pair of photoflash lamps.

18. A photoflash assembly according to claim 17 wherein said photoflash lamps are normally in an open-circuited condition after flashing.

19. A photoflash assembly according to claim 17 wherein the branch circuit of at least one of said photoflash lamps contains a current-sensitive fuse in series with said photoflash lamp.

20. A photoflash assembly according to claim 17 wherein the branch circuit of at least one of said photoflash lamps contains a heat-sensitive fuse in series with said photoflash lamp.

21. A photoflash assembly according to claim 19 wherein said voltage breakdown device and said current-sensitive fuse are fabricated in integrated circuit form.

22. A photoflash assembly according to claim 10 wherein a multiplicity of photoflash lamps are connected in series to one terminal of a chargeable capacitive element through a resistance and a normally open switch, and in which connections to the other terminal of said chargeable capacitor are made through current-sensitive fuses connected in parallel with each other and each connected to a point between a pair of said photoflash lamps, with the last photoflash lamp also being connected to said other terminal of said chargeable capacitor, and wherein said photoflash lamps normally become short-circuited upon flashing.

23. A photoflash assembly according to claim 22 in which a voltage breakdown device is used in parallel with at least one of said lamps to assure that said lamp will effectively become short circuited upon flashing.

24. A method for selectively sequentially flashing each photoflash lamp in a multiplicity of photoflash lamps wherein an electrical signal of limited energy is applied through a voltage-dividing resistance to a first photoflash lamp in a branch circuit and to a first voltage breakdown device simultaneously, with the resistances of said lamp and said voltage breakdown device being proportioned so that the lamp flashes without causing dielectric breakdown in the voltage breakdown device, and then, upon application of the next electrical signal, said first voltage breakdown device undergoes dielectric breakdown and becomes conducting, allowing said next electrical signal to be applied simultaneously to a second photoflash lamp and a second voltage breakdown device which are selected to act in the same manner as said first lamp which has already been flashed and said first voltage breakdown device which has already undergone dielectric breakdown, with this sequence being repeated as desired for each lamp and voltage breakdown device in the photoflash assembly.

25. A method according to claim 24 wherein the photoflash lamps used become open-circuited upon flashing.

26. A method according to claim 24 wherein a current interrupting device is utilized in series with each photoflash lamp to assure that the branch circuit of each lamp becomes open-circuited upon flashing of the respective lamps.

27. A method for selectively sequentially flashing photoflash lamps in a photoflash assembly having a multiplicity of photoflash lamps wherein said photoflash lamps become short-circuited upon flashing and wherein, upon application of an electrical signal of limited energy, the first lamp flashes, and then a current-sensitive fuse which directly connects said first lamp in series with said signal becomes open-circuited so that the next electrical signal will be applied directly to the second photoflash lamp in said photoflash assembly, with this sequence being repeated as desired for each lamp and fuse in the photoflash assembly.

28. A method according to claim 27 wherein a current shorting device is used in parallel with at least one of said lamps to assure that the circuit of such lamp closes upon flashing of the lamp.

References Cited

UNITED STATES PATENTS

| | | | |
|---|---|---|---|
| 3,113,241 | 12/1963 | Yonushka | 315—200 |
| 3,376,472 | 4/1968 | Taylor et al. | 315—226 |
| 3,353,062 | 6/1967 | Nuckolls | 315—157 |
| 3,421,049 | 1/1969 | Logan | 315—211 |
| 3,417,259 | 12/1968 | Nozawa et al. | 307—108 |

JOHN HUCKERT, Primary Examiner

R. F. POLISSACK, Assistant Examiner

U.S. Cl. X.R.

315—241, 245, 323; 250—209; 431—95; 340—223, 227, 251